Patented June 9, 1936

2,043,363

UNITED STATES PATENT OFFICE 2,043,363

REDUCTION OF ORES BY METALLIC CALCIUM

Peter P. Alexander, Marblehead, Mass., assignor to Ventures Limited, a corporation of Canada No Drawing. Application July 7, 1934,
Serial No. 734,203

4 Claims. (Cl. 75—84)

This invention relates to the method of obtaining metals from ores such as oxides or sulfides of metals by reducing them with metallic calcium.

An object of the present invention is the provision of a process for the production of metals in a high state of purity.

A further object of the invention is the provision of a process of high efficiency.

It has been known in the art that metallic calcium is one of the best agents for the reduction of refractory oxides. This element has also the greatest affinity for sulfur, so that sulfides treated at a sufficiently high temperature with this element are readily reduced.

Attempts have been made in the past to use calcium for the reduction of oxides and sulfides on a factory scale. However, these attempts did not meet with entire success on account of the necessity of using it greatly in excess of the theoretical quantity needed. With the best laboratory practice it is necessary to use an excess of 50% and if the reduction is attempted on a larger scale a still greater excess of calcium is necessary to produce a complete reduction of the compound treated. With the comparatively high cost of metallic calcium this condition prevented until now the use of this otherwise very desirable reducing agent on a large scale.

The usual method of using calcium as a reducing agent is to mix small pieces of this element with the compound to be treated, to then place the mixture in a suitable container and to heat that container to a temperature above the melting point of calcium, usually to 900° to 1000° C.

The difficulty which has been experienced in the past is that as soon as the calcium reduces an oxide under treatment for example, there is a formation of the refractory calcium oxide which forms layers around the particles of unreduced oxide. These layers to a considerable degree prevent the further contact of calcium with the oxide. The result is that an appreciable percentage of the oxide will not be reduced to metallic state.

To improve this condition and to insure an intimate contact of all parts of the oxide with calcium, attempts have been made to use calcium in the form of freshly prepared shavings and in considerable excess of that theoretically needed.

However, due to the very great affinity of calcium for oxygen the preparation of large amounts of shavings requires a special technique, otherwise the surface of each particle or shaving will be covered with a layer of calcium oxide, and will make it imperative to use much greater amounts of calcium than theoretically necessary.

From one point of view it is desirable to reduce the size of the calcium shaving so as to produce a greater surface of contact with the oxide to be treated. From the other point of view the smaller the shavings are, the greater is the surface of exposure of calcium to the action of the oxygen of the air with the greater resulting loss of calcium.

The preparation of calcium in the form of fine particles by simple means such as crushing, is not practicable, since this element is very ductile and instead of being reduced to a state of powder would be pounded into plates and filaments.

In my pending application Serial No. 665,571 filed on April 11, 1933, assigned to the General Electric Company, the "Method for reduction of refractory oxide" by means of nascent hydrogen, I described the use of calcium hydride, which can be mixed with the oxide or sulfide under treatment. The next step in that process as described in the above application was to produce a decomposition of calcium hydride into nascent hydrogen and nascent calcium. The nascent hydrogen diffuses readily through the mass of the material present in the retort and combines with oxygen forming moisture which instantly reacts with metallic calcium forming calcium oxide with a further release of hydrogen. In that process I use, as a reducing agent, nascent hydrogen and calcium merely to absorb the produced moisture. No intimate contact of calcium with the metallic oxide is necessary.

In the present invention I use as a reducing agent specially prepared metallic calcium.

The treatment of calcium prior to its use as a reducing agent consists in subjecting it to the action of such gases as hydrogen, nitrogen, argon and such others as are absorbed by calcium in appreciable amounts at dull red heat and normal gas pressure, and which are evolved from the calcium at about the same temperature in the vacuum.

After the absorption of sufficient amounts of gas the metallic calcium becomes very brittle and can be easily crushed into almost impalpable powder. The subsequent treatment of the produced powder in the vacuum results in the evolution of the absorbed gas in a very short time leaving a finely powdered metallic calcium in a chemically active state.

I have found that the vacuum treatment can be carried out also before the crushing of calcium, since even a very small amount of the absorbed gas which resists the vacuum treatment and is left in metallic calcium is sufficient to impart sufficient brittleness.

In practicing my invention I employ a cylindrical container provided with an electric heater and connected alternatively by means of pipes provided with stop cocks with a supply of suitable gas and the vacuum system. Metallic calcium in large lumps is placed in the container and the air in the container is replaced with hydrogen. As soon as the temperature of the container is raised to dull red heat the gas is absorbed in large quantities by metallic calcium.

After cooling to a lower temperature the calcium, now rendered very brittle, is pulverized into a fine powder either by an iron rod or by hard balls loaded into the container with the calcium. The crushing is conveniently effected by imparting to the container a rotary motion such as is used in pulverizing various materials in ball or rod mills.

As soon as the calcium is reduced to a state of fine powder the container is connected with the vacuum system and the occluded gas is extracted from the powdered calcium.

At this moment the powdered chemical compound to be reduced, such as oxide, sulfide or chloride of a metal, is added and thoroughly mixed with powdered calcium.

Then the temperature of the container is raised by means of an electric heater until the reaction takes place.

When hydrogen or nitrogen are used in sufficient amounts they combine chemically with calcium producing the brittle compounds, calcium hydride or calcium nitride respectively. However, I found that even a small amount of gas left in occluded or combined state in calcium produces sufficient brittleness.

I found that by using these means of reducing metallic calcium in the container itself into a fine powder and thoroughly mixing it with the compound to be reduced, the complete reduction can be accomplished with the theoretical amount of calcium.

This method results in the saving of at least 33% of comparatively expensive metallic calcium, insures complete reduction of the compound, introduces less impurities always present in commercial calcium and necessitates less of nitric and other acids for the removal of calcium oxide after the completion of the treatment.

The modifications of the process described above may occur to those skilled in the art, but such as fall within the scope of the appended claims are contemplated by me as forming part of my invention.

What I claim as new and desire to secure by Letters Patent of the United States, is:—

1. A method of reduction of powdered compounds which comprises the placing of ingots of metallic calcium into a container filled with hydrogen, raising the temperature of said container to the temperature of incipient red heat, crushing the embrittled calcium in said container into fine powder, placing the powdered compound into said container, mixing it with powdered calcium, expelling hydrogen from calcium by establishing a vacuum in said container and further raising the temperature above red heat.

2. A method of reduction of powdered oxides which comprises the placing of ingots of metallic calcium into a container filled with hydrogen, raising the temperature to incipient red heat, crushing the embrittled calcium in said container into fine powder, introducing powdered oxide into said container, mixing it with powdered calcium, expelling hydrogen from calcium by establishing vacuum in said container and further raising the temperature above red heat.

3. A method of reduction of mixtures of oxides which comprises the placing of ingots of metallic calcium into a container filled with hydrogen, raising the temperature to incipient red heat, crushing the embrittled calcium in said container into fine powder, introducing powdered oxides into said container, mixing it with powdered calcium, expelling hydrogen from calcium by establishing vacuum in said container and further raising the temperature above red heat.

4. A method of reduction of oxide and metallic powder which comprises the placing of ingots of metallic calcium into a container filled with hydrogen, raising the temperature to incipient red heat, crushing the embrittled calcium in said container into fine powder, introducing a mixture of powdered oxide and metal into said container, mixing them with powdered calcium, expelling hydrogen from calcium by establishing vacuum in said container and further raising the temperature above red heat.

PETER P. ALEXANDER.